Figure 1:
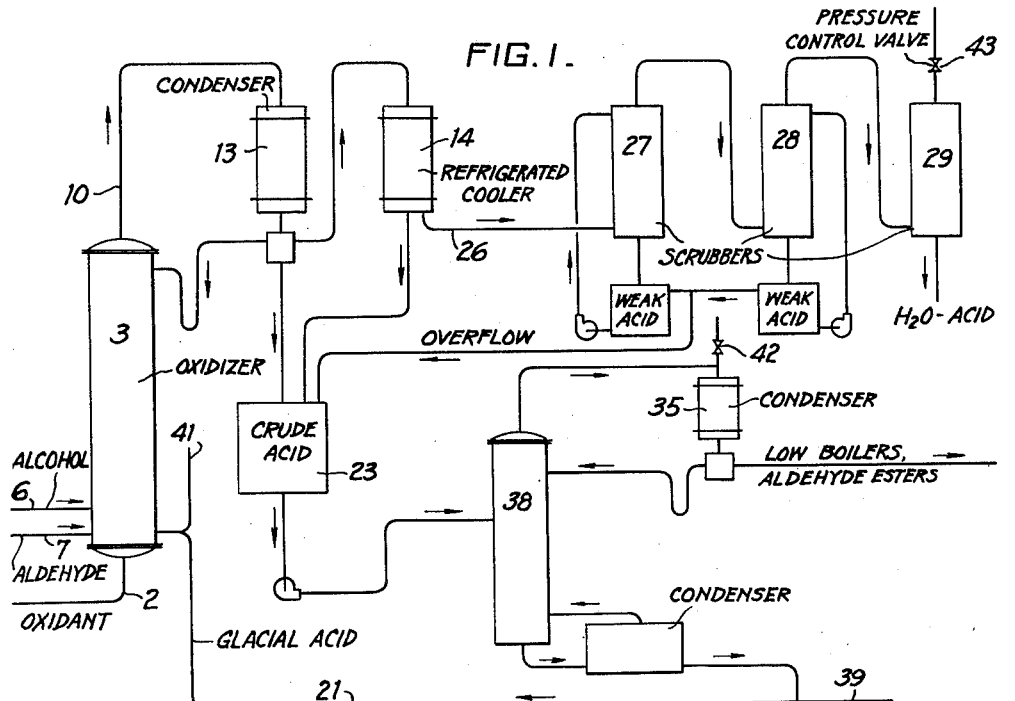

May 8, 1951 — D. C. HULL — 2,552,175

CONTINUOUS OXIDATION OF ALCOHOLS

Filed Nov. 6, 1948

DAVID C. HULL
INVENTOR
ATTORNEYS

Patented May 8, 1951

2,552,175

UNITED STATES PATENT OFFICE 2,552,175

CONTINUOUS OXIDATION OF ALCOHOLS

David C. Hull, Kingsport, Tenn., assignor to Eastman Kodak Company, Rochester, N. Y., a corporation of New Jersey Application November 6, 1948, Serial No. 58,658

7 Claims. (Cl. 260—531)

This invention relates to a continuous process for oxidizing hydroxy and other organic compounds in the presence of an aldehyde activated catalyst. More particularly the process concerns the direct oxidation under pressure of ethyl alcohol to acetic acid, the reaction being carried out in the presence of an aldehyde activated catalyst whereby improved results are obtained.

This invention comprises an improvement over the process described in my several companion patents, namely Patents 2,287,803; 2,354,683; 2,-353,157; 2,353,158; 2,353,159; and 2,353,160 and other of my patents and pending patent applications. The instant application is a continuation-in-part of my application Serial Number 17,346 filed March 26, 1948, now Patent No. 2,497,889. In my patents aforementioned I have described the oxidation of numerous compounds in the presence of an aldehyde activated catalyst, the catalyst component being comprised of various different metals. For example, in particular I have described the direct oxidation of ethyl alcohol to acetic acid carried out in the liquid phase in the presence of an aldehyde-activated, metal acetate catalyst in an acetic acid solution. While reference is made to the processing of a primary alcohol for illustrative purpose, as will be noted from my several patents referred to above, secondary alcohols and various other organic compounds may be processed in a similar manner. While the operation of the aforementioned processes is satisfactory and large amounts of alcohol may be fed through the liquid catalyst solutions and oxidized to the corresponding acids with good yields, I have now found certain improvements whereby still greater amounts of alcohol may be fed through the solution and efficiently oxidized to the desired compound over long continuous periods. In other words, I have now found how much greater capacity may be obtained from an oxidation unit of a predetermined size and how a longer sustained operation may be accomplished under varied conditions of commercial operation.

This invention has for one object to provide a process with increased capacity for the direct oxidation of organic compounds to a desired oxidation product. Still another object is to provide a direct oxidation process for hydroxy compounds which process has increased capacity as compared with similar existing processes. A still further object is to provide a liquid phase oxidation process employing an aldehyde activated catalyst wherein the catalyst life may be extended a substantial period. A further object is to provide an oxidation process under pressure for the direct oxidation of hydroxy compounds and other compounds. Still another object is to provide a direct oxidation process under pressure particularly applicable to the direct conversion of lower aliphatic alcohols to lower aliphatic acids, such as the direct conversion of ethyl alcohol to acetic acid. Another object is to provide an apparatus arrangement for efficiently carrying out the aforementioned process. Other objects will appear hereinafter.

In the prior art the production of acids from hydroxy compounds, as for example the conversion of ethyl alcohol to acetic acid, generally required first converting the ethyl alcohol to acetaldehyde and thereafter converting the acetaldehyde to acetic acid. It is apparent that uch prior process required not only several steps, but that greater losses were experienced because of the lack of directness. In my patents aforementioned I have described processes for the more direct conversion of ethyl alcohol to acetic acid.

In the operation of the process in accordance with my prior patents, while a certain amount of increased capacity and yields or changed operation or the like may be obtained by increasing the amount of alcohol fed into the oxidizer together with an increase in the amount of oxidizing medium, it was noted that if too great an amount of the alcohol was fed after any particular one system had been balanced sometimes certain amounts of unconverted alcohol came through the process, or the catalytic activity of the catalyst solution decreased. That is, in prior operation, after a system has been balanced for long continuous operation, substantial changes in feed composition or the like may retard the process. Also, in prior operation there was sometimes a tendency to form esters, as for example, in the instance of ethyl alcohol oxidation some ethyl acetate may form probably from the reaction of the acetic acid produced with unoxidized alcohol. Or in some instances, it was necessary to replace the catalyst with new catalyst. Of course, increased capacity might be obtained by building an oxidation unit larger or building more oxidation units, but this would require more building space and the installation of more units would require more operators to operate the added units.

In accordance with the present invention, I have found that long term sustained continuous operation at increased capacity with equal to or better than present efficiency of conversion may be obtained by operating as described herein. I have found that my process may be made to operate over extended periods without loss or destruction of catalyst activity by substantially continuously controlling the compositions of the liquid catalyst solution in a certain manner. In further detail, I have found that greater amounts of acetic acid may be produced directly from ethyl alcohol in substantially the same size unit, compared with the usual unit used in the past, or at least in a unit not requiring any greater floor space by operating in accordance with the present invention.

For a more complete understanding of my invention, reference is made to the attached drawing forming a part of the present application in which, Figure 1 is a semi-diagrammatic elevational view, in the nature of a flow sheet, showing one apparatus arrangement which may be employed for carrying out the process in accordance with the invention.

Figure 2:
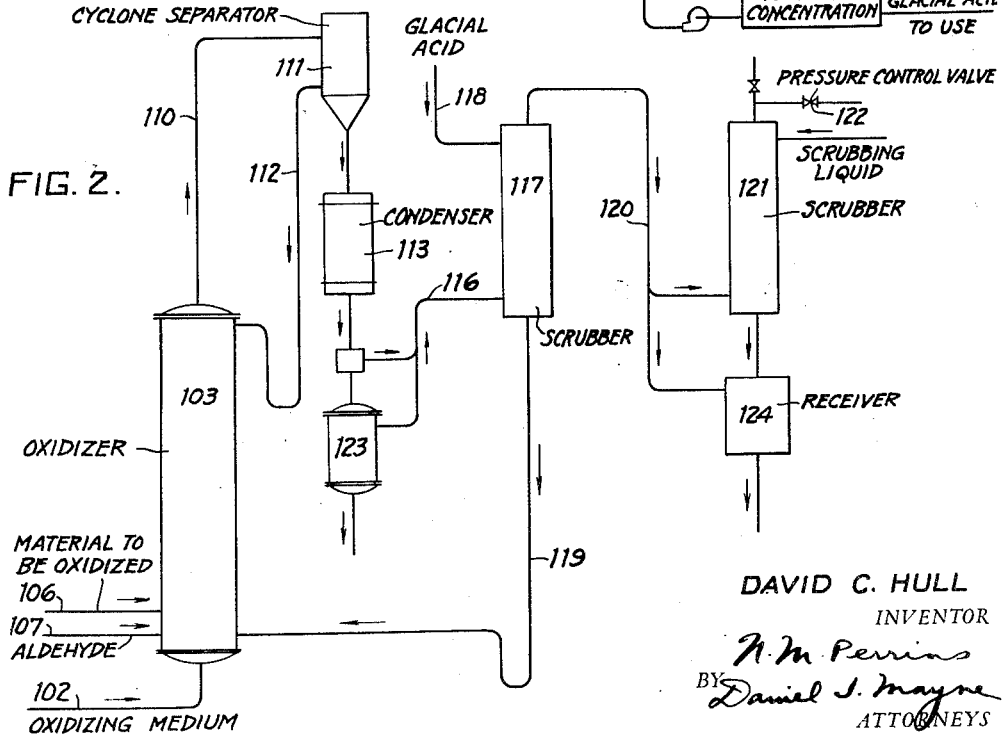

Figure 2 is a semi-diagrammatic elevational view of another form of apparatus in which the process may be carried out.

Referring further to the drawing, there is provided an oxidation column 3 equipped with inlet 2, for air, oxygen, or the like oxidizing medium, inlet 6 for alcohol and/or other compound to be oxidized, and inlet 7 for aldehyde. The oxidizer is provided with a vapor offtake conduit 10 which leads through condensers 13 and 14, which condensers are connected by conduit 26 to one or more scrubbers 27, 28, and 29.

As may be noted, the aforementioned parts may be the same or otherwise substantially comparable to the corresponding parts shown in my patents aforementioned, as for example by Patent 2,287,803. That is, the oxidation unit 3 provided for herein may be exactly the same as oxidation unit 3 shown in Patent 2,287,803, but is not limited thereto. The several types of oxidation columns described in Hasche Patent 2,159,938 may also be employed. Likewise, the several scrubbers may be constructed and arranged as shown in the attached drawing. Various other parts such as weir boxes, feed tanks, and the like designated 8, 9, 17, 18, 19, etc., on my patent aforementioned may be included if desired and may be the same as in my prior patents. Hence, extended description and discussion of such type parts appears unnecessary herein.

Referring further to Figure 1 herewith, it will be noted that the acid receiver 23 is connected to a distillation column 38 and this column is connected with means 39, for the concentration of and return of anhydrous acid through conduit 21 to the oxidation column 3. The acid concentration may be by any convenient method such as azeotropic distillation, extraction or combination processes. Also externally obtained concentrated acid and catalyst may be added to return line 21 at 41. It will be further observed that the vents, not only from the scrubbers, but also from condenser 35 are provided with throttling means, 42 and 43, whereby pressure may be built up in the system. As will be touched upon hereinafter, it will be noted that the condensation in my process may be largely accomplished by water condensers and that expensive refrigeration requirements are reduced.

Figure 2, another apparatus arrangement for carrying out my process, may in many parts and respects be the same as described in connection with Figure 1. That is, the oxidizer 103 and the various feed lines 102, 106, 107 may be the same as comparable parts in Figure 1. However, in Figure 2 vapor off-take line 110 leads to cyclone separator 111 which separates catalyst and the like liquid for return to the oxidizer 103 through conduit 112. The cyclone separator is also connected with condenser 113 which in turn is connected with a crude acid receiver 123 much the same as described in connection with Figure 1.

The uncondensed vapors through conduit 116 pass to scrubber 117 which is different from the arrangement of Fig. 1. That is, in this scrubber glacial acid used for keeping up the catalyst concentration may be supplied as the scrubbing medium through 118. This dual use of the recycled glacial acid increases the efficiency of the process. Conduit 119 carries this glacial acid for catalyst control back to oxidizer 103.

The effluent vapors from this special scrubber 117 pass through conduit 120 to one or more additional scrubbers 121 which may be the same or similar to those described in Figure 1. As mentioned under Figure 1, the final vent lines may be valved as at 122 in order that pressure may be built up in the system.

Of course, it will be understood that suitable flow meters, thermometers, valves, and other devices may be employed in the apparatus arrangements aiding in the functioning of the apparatus or rendering it automatic or semiautomatic. The part in contact with corrosive constituents would preferably be constructed of stainless steel, such as the well known Cr-Ni-Mo steel, or other material capable of withstanding acid corrosion. The part to be subjected to heating would be constructed of suitable heat resistant materials such as chromium-nickel and chromium-aluminum alloys.

The functioning of my apparatus and particularly the arrangement shown in Figure 1, as well as an understanding of my improved process, will be more apparent from the specific examples which follow. It is to be understood that these examples are merely illustrative and my invention is not limited to the specific organic compounds therein disclosed.

In general, the operation of my process and apparatus will in many respects be similar to the procedure described in my patents aforementioned. The oxidation column is filled with a solution of the catalyst. It will be kept in mind there are a number of catalyst solutions which may be used and are described in my patents aforementioned. A small amount of air or oxygen pressure may be delivered to the bottom of the perforated plate after the catalyst solution has been incorporated in the oxidation unit. Then both aldehyde and oxidant (with or without heating) are passed through the solution for a period usually until a color change takes place, in the case of cobalt acetate catalyst, to show the catalyst has become activated. Thereafter, the compound to be oxidized is fed in, preferably with the continued feeding of at least a small amount of aldehyde for aiding in keeping the catalyst active. Large amounts of aldehyde will also keep the catalyst active and may be fed, if desired. In the instance of oxidizing ethyl alcohol a feed comprised of 50-75% or thereabouts of ethyl alcohol, the remainder being acetaldehyde, is satisfactory. Also, it is a notable species of the present invention that esters, such as ethyl acetate, may be fed in along with alcohol for minimizing any ester formation, and without catalyst injury in the present process. Air under slight to 75 pounds pressure is introduced as oxidizing medium, although, if desired, oxygen as such may be used.

After the process has been in operation for a short period, assuming air has been used, the nitrogen of the air escaping from the top of the column carries with it acetic acid together with any unconsumed aldehyde, etc., which, in passing through condensers 13 and 14, becomes largely condensed out flowing into receiver 23. At least a part of this acid is withdrawn to distillation column 38 and associated parts 39 where it is rendered anhydrous and such portion thereof as may be required returned to the oxidation unit. Preferably sufficient anhydrous acetic acid is returned to keep the content of acetic acid of the catalyst solution greater than 80%. However, it will be noted at this point that in the present invention any dry organic acid such as propionic, butyric, etc., may be used to control the catalyst.

By closing the valves 42 and 43 in the vent lines and throttling them down, pressure in the entire apparatus may be built up to a point so that there is at least about 20 to 30 lbs. or more pressure on the vapors passing through the condensers 13 and 14. At this pressure the condensation in condensers 13 and 14 is improved and their capacity for condensation is increased, since the components under the higher pressure condense more readily. The temperature of the oxidation unit is controlled by temperature controlling coils within or encircling the oxidation unit as described in my prior patents, to a sufficiently low value for keeping the components, namely the bulk of the catalyst solution, in liquid phase. The temperature is generally below 130° C., but the exact temperature which would be employed would depend upon whether high-boiling components such as high-boiling hydroxy compounds are being oxidized or lower-boiling components such as ethyl alcohol, the particular pressure applied, and the like. After the process has been placed in operation, as indicated, I found in the present invention that the quantity of organic compound being oxidized may be increased. By virtue of the return and/or addition of anhydrous acid the catalyst does not lose its activity even though ester or other diluent is being fed as above described and/or higher amounts of alcohol are being put though the system. Consequently, the process may be operated at high capacity substantially continuously for an extended period without catalyst failure.

Referring now to the specific examples, in the first example a comparison is made between operating the same oxidation unit under relatively no pressure without return of glacial acid as compared with operation in accordance with the present invention with the return of glacial acetic acid.

EXAMPLE I

Run A

A column of the type described above was filled approximately two-thirds full with catalyst solution. The catalyst solution was comprised of about 3% of cobalt acetate in glacial acetic acid. However, during the activation of the catalyst further cobalt acetate was added, bringing the content thereof up to about 6%. The air valve was opened slightly to admit air under pressure and acetaldehyde was fed into the unit. Steam was put on the coils so that the temperature of the oxidation unit was raised to 60° C. After several hours it was determined that the catalyst solution was sufficiently active and in a condition whereby full operations could be carried out. As indicated above, this particular run was conducted in accordance with prior type of operation employing about atmospheric pressures and no acid return and/or addition to the catalyst solution.

The feed to the balanced oxidation column comprised approximately 20 mol per cent ethyl alcohol and 80 mol per cent acetaldehyde. The ultimate yield, based on the ethyl alcohol fed over the period of operation, was in excess of 92%. The losses due to acetaldehyde and alcohol becoming decomposed to carbon dioxide were less than 2%. Over the particular period of operation being observed approximately 300 units of ethyl alcohol were fed into the oxidation apparatus with the aforementioned ultimate yield and a conversion of ethyl alcohol to acetic acid of 70% per pass.

After operating in the above manner for twelve hours, the feed was stepped up to 30 mol per cent ethyl alcohol and 70 mol per cent acetaldehyde. While more hydroxy compound was being put through, the ultimate yield dropped to 88% and the conversion of ethyl alcohol to acetic acid dropped to less than 25%. The catalyst was showing decreasing activity at the end of ten hours operation in this manner. The feed was again increased so that the ratio was 35 mol per cent alcohol and 65 mol per cent acetaldehyde. In two hours time, the activity of the catalyst had dropped to such a point that no great amount of alcohol was being oxidized and also no great amount of acetaldehyde was being oxidized. This indicated that the limiting ratio of ethyl alcohol to acetaldehyde for the above initially balanced conditions and for efficient oxidation was probably around 20–25 mol per cent alcohol and 70–75 acetaldehyde.

Run B

In accordance with this run the catalyst solution, temperature and other features described were the same as in Run A, excepting that arrangements were made to feed in glacial acetic acid in order to keep the per cent acetic acid in the catalyst up to 85 per cent or better. The feed was started at 20 mol per cent alcohol and 80 mol per cent acetaldehyde as in Run A. It was not necessary to feed glacial acid since the per cent acetic acid in the catalyst remained at 85 per cent to 88 per cent. When the feed was changed to 30 mol per cent ethyl alcohol and 70 mol per cent acetaldehyde a small amount of glacial acetic acid was fed to maintain the per cent acid in the catalyst at 85 per cent. The feed ratio was gradually stepped up and the glacial acid return was increased until a ratio of 70 mol per cent ethyl alcohol and 30 mol per cent acetaldehyde was reached, and the glacial acid return for controlling catalyst composition under the conditions of this example was approximately 1.5–2.0 pounds per pound of acid produced. After continuous operation for several weeks and feeding approximately 1,000 units of ethyl alcohol per day, the catalyst was still very active and the ultimate yield based on ethyl alcohol averaged 92–95 per cent with a conversion per pass ranging from 50–70 per cent of ethyl alcohol to acetic acid. In comparing this run to Run A, one can see the importance of the present invention of feeding glacial acid to the system to keep the catalyst composition controlled, when it is desired to oxidize compounds other than aldehydes at a maximum rate. To keep the catalyst at its maximum activity it is desirable to keep the per cent acid in the catalyst at approximately 80 per cent or above.

Run C

In accordance with this run the catalyst solution, temperatures, and all other features described in connection with the preceding runs were the same, excepting that by closing the throttling valve aforementioned the pressure was permitted to build up in the oxidation setup to in excess of one atmosphere but below two atmospheres pressure. In this run the feed ratio of 70–30 per cent was the same as above described. Likewise, the control of the temperature within the column to below 100° C. and other details of operation were in accordance with the above runs. In this Run C the ultimate yield based on the ethyl alcohol fed was in excess of 95 per cent. Likewise, the losses of alcohol and aldehyde by decomposition to carbon dioxide were substantially below 2 per cent each. However, in accordance with this Run C with both glacial acid addition and pressure, in the same period of operation, it was possible to feed to the unit, not just 1,000 units of alcohol, but of the order of 1400–1600 units were fed. In addition, most of the condensers and scrubbers were operated with unrefrigerated water, whereas in the preceding Run A refrigeration was used for obtaining efficiency of condensation and scrubbing. In this Run C there was recirculated to the catalyst oxidation apparatus approximately 3 lbs. of glacial acetic acid per lb. of acetic acid produced, and it was observed that the activity of the catalyst appeared to be unreduced even at the end of a substantial period of operation. Also, during a part of the period of operation ethyl acetate formed during the process was separated and fed back to the oxidation, thereby minimizing further formation and without any noticeable damage to the catalyst.

EXAMPLE II

In accordance with this example, several other runs were conducted generally in accordance with Runs B and C above as respects catalyst composition return and/or addition of glacial acid and the like details. However, the pressure within the oxidation apparatus was held at various values from just above atmospheric to around 50 lbs. per sq. inch. Also, the temperature was held at different values by controlling the circulation of the temperature controlling medium in the oxidation unit from between 60° C. to 115° C. It was observed that the over-all conversion to acetic acid at these higher or lower temperatures and elevated pressures was of the order of Runs B and C and the loss due to carbon dioxide formation was not increased. That is, in this example the yield of acetic acid was in excess of 90 per cent and the losses due to carbon dioxide formation were, in general, not greater than 2 per cent. However, throughput of alcohol and the quantity of acid obtained, per unit of time was 30 per cent to 55 per cent greater in the same size unit as compared to prior art operation.

EXAMPLE III

A column of the type described above was filled approximately two-thirds full with a catalyst solution which comprised about 3 per cent cobalt acetate in glacial acetic acid. The air valve was opened to admit air and acetaldehyde feed was turned on. The temperature of the catalyst solution was at 25–30° C., and after two hours the temperature rose rapidly to 60° C. at which time cooling water was added to maintain the temperature at 60–70° C. More cobalt acetate was added, bringing the content up from 3 per cent to 6 per cent. After several hours operation with the additional cobalt acetate added, the catalyst solution was sufficiently active to start full operations.

The feed to the oxidation unit in this case was 70 mol per cent propyl alcohol and 30 mol per cent acetaldehyde. The pressure at the top of the unit was maintained at 25 pounds per square inch. The temperature of operation was 120–130° C. The rate of acetaldehyde feed was fourteen pounds per hour and the propyl alcohol feed was 48 pounds per hour. In order to maintain the catalyst per cent at 85 per cent acid it was necessary to feed glacial acid at a rate of 3 to 3.5 pounds per pound of acetic acid plus propionic acid produced. The ultimate yield based on the propyl alcohol fed was in excess of 90 per cent and the conversion of propyl alcohol to propionic acid was 50 per cent. After twenty-four hours successful operation, the glacial acid feed was cut off and within 30 minutes time, not only had the conversion of propyl alcohol to propionic acid dropped to a low value but the conversion of acetaldehyde to acetic acid had also dropped to a low value. Here again, the importance of maintaining the per cent acid in the catalyst preferably in the neighborhood of 85 per cent is indicated.

EXAMPLE IV

After preparing an active catalyst as in Example III butyl alcohol was fed to the oxidation unit along with acetaldehyde. The ratio of feed was 60 mol per cent butyl alcohol and 40 mol per cent acetaldehyde. The rate of feed was 54 pounds per hour of butyl alcohol and 21 pounds per hour of acetaldehyde. The pressure at the top of the unit was maintained at 25 pounds and the temperature was maintained at 120–130° C. throughout the unit. Glacial acid was fed in at a rate of 3–3.5 pounds per pound of acetic acid and butyric acids produced. Due to the high boiling point of the acid the catalyst solution level in the oxidation unit was maintained by withdrawing a portion of the catalyst solution continuously to a vacuum still, to distill off the acid produced, then pump the catalyst solution back to the oxidation unit. This was done because the level in the unit would not boil down at 130° C. and 25 pounds pressure, and this pumping technique appeared to be better than applying a higher temperature for boiling off catalyst liquid. The ultimate yield based on butyl alcohol fed was 91 per cent and the conversion of butyl alcohol to butyric acid was 55 per cent. By cutting down on the glacial acid feed to two pounds per pound of acetic acid and butyric acid being produced, the oxidation dropped off to such a point within two hours that only very small conversion of acetaldehyde to acetic acid or butyl alcohol to butyric acid was being obtained.

In the above examples which have been set forth for illustrating the preferred embodiments of the present invention I have referred to the exact value of 85 per cent acid content of the catalyst, the use of glacial acetic acid for return and/or addition to the catalyst, the supplying of acetaldehyde for catalyst activation and the like details. However, it should be noted that such details are not to be considered an undue limitation on the present invention. For example, other aldehydes than acetaldehyde may be used for activating the catalyst and in many instances it may be more convenient or desirable to use propionaldehyde, butyraldehyde, or the like such as when propanol and/or butanol are the organic compounds being oxidized. However, as described above in detail, acetaldehyde functions satisfactorily and is a common commercially available aldehyde of low boiling point of present lower cost than some of the other aldehydes so was chosen as illustrative of catalyst activation examples of my invention.

Likewise, with respect to the acid used for controlling the acid content of the catalyst solution to 80–85 per cent or higher, acetic acid has been cited as illustrative since this is a common, readily available acid. Here again other acids such as propionic, butyric, or the like may be employed in a comparable manner.

As shown in the drawings, my process may be carried out in several different arrangements of apparatus and the catalyst separated for return several ways, either mechanically by a cyclone separator, distilling or pumping off, or by combinations of procedures. As shown in Fig. 2, one convenient way of supplying the glacial acid for controlling the catalyst composition in accordance with the present invention is as a scrubbing liquid, whereby for economy of operation it picks up further acid content and possibly any escaping catalyst, before being conducted to the oxidation unit containing the main body of catalyst.

While it is not desired to be bound by any theory of operation, the following explanation may aid in a better understanding of the instant invention and its merit. In direct oxidation processes of the class described employing a liquid oxidation catalyst solution, exemplified by an ester of a metal in an organic acid, the capacity of the catalyst solution may be limited by its acid content. Consequently, when a process is stepped up by feeding more organic compound such as alcohol, alkyl acetate (the latter perhaps being a catalyst solution diluent) the acid content of the catalyst solution becomes lower. This lowering may also come from water generated from the oxidation of the alcohol or other organic compound and when greater amounts of alcohol are forced through the process greater water generation occurs, thereby diluting the catalyst solution at a faster rate than is compensated by the water removal by normal aqueous acid product withdrawal. This theory of catalyst dilution is supportable by the fact that if a stream of water is returned to the catalyst rather than glacial organic acid, the stream of water kills the catalyst. Therefore, it appears that as long as my catalyst solution is maintained at high acid content by the return and/or addition of glacial acid or anhydride, the catalyst solution will sustain long term continuous operation even at high input (such as under pressure) of the organic compound being oxidized. Therefore, in the process of the present invention I prevent the catalyst dilution at a higher rate than it is being caused by the increased throughput to the process. By the increased throughput of the organic compound to be oxidized I am able to get greater capacity out of any particular apparatus setup without materially changing the setup, excepting for adding the necessary lines, tanks, and the like for supplying dry acid as described above for controlling catalyst composition. It will be noted in particular that the acid which I return and/or add is dehydrated (dry) acid, preferably glacial acid. This dehydration may be accomplished by azeotropic distillation and/or extraction. The drier the acid, the smaller the amount required to be supplied for catalyst control.

Therefore, from the preceding examples it is apparent that I have provided an improved method and arrangement, whereby a greater production of oxidation product may be obtained without increasing the over-all size, the use of more floor space, and the use of more operators. My process may be carried out using a large number of different metal catalysts, as described in my companion patents, and applied to the oxidation of a large number of organic compounds. Inasmuch as the different catalyst and compounds which may be treated are described in my other patents in detail, extended description herein is unnecessary.

I claim:

1. An improved oxidation process for the direct oxidation of lower aliphatic alcohols for producing the corresponding organic acid therefrom whereby larger amounts of said alcohol may be processed at high efficiency which comprises incorporating a liquid oxidation catalyst in an oxidation zone to a predetermined level, said liquid catalyst consisting essentially of a relatively dry lower aliphatic acid containing greater than 3% of a cobalt salt, passing lower aliphatic aldehyde and gaseous oxidizing medium through said relatively dry acid and catalyst in said oxidation zone until the catalyst becomes activated, introducing feed material and gaseous oxidizing medium into contact with said activated cobalt catalyst liquid in said oxidation zone, said feed materials consisting essentially of the alcohol to be oxidized and also a content of aldehyde, said alcohol being the primary component of the feed, but the content of said aldehyde being present in amount at least as great as ⅓ the amount of the alcohol, maintaining the aforesaid oxidation process under an elevated pressure in excess of ½ atmosphere and at a temperature above 50° C. but below a temperature at the elevated pressure of the reaction whereby the predetermined liquid level aforementioned is caused to become materially lowered, withdrawing and condensing under elevated pressure the organic acid produced by the reaction and substantially continuously adding relatively dry lower aliphatic acid to the activated catalyst liquid aforementioned of a dryness and in an amount to keep the acid content of the catalyst liquid in excess of 80% during the operation of the process.

2. An improved oxidation process for the direct oxidation of lower aliphatic alcohols in an oxidation zone for producing the corresponding organic acid therefrom, whereby larger amounts of the alcohol may be processed in the oxidation zone at high efficiency which comprises supplying the oxidation zone to a predetermined level with catalyst liquid consisting essentially of a relatively dry lower aliphatic acid containing more than 3% of catalyst salt, activating the catalyst liquid by pasing therethrough a lower aliphatic aldehyde and a gaseous oxidizing medium, substantially continuously introducing feed materials and air into contact with the activated catalyst solution, said feed materials containing as the primary component the lower aliphatic alcohol to be oxidized and also containing a material amount of a lower aliphatic aldehyde, maintaining the oxidation zone under a pressure in excess of 1 atmosphere and at a temperature between 50° C. and 10° C. above the boiling point, at the pressure prevailing in the zone of the organic acid being produced, substantially continuously withdrawing from the oxidation zone effluent gases essentially comprised of the aliphatic acid produced and also containing aldehyde and alcohol, subjecting the effluent gases thus withdrawn to condensation under pressure conditions above 1 atmosphere whereby water cooling may be employed to give a condensate containing aliphatic acid, separating and concentrating a part of this aliphatic acid to a relatively dry acid and returning a portion of this dry acid to the catalyst liquid in the oxidation zone for keeping the acid content of the catalyst liquid in excess of 80%.

3. A process for the direct oxidation of lower aliphatic alcohols for producing the corresponding organic acid therefrom whereby larger amounts of said alcohol may be oxidized in an oxidation unit at a high efficiency which comprises supplying the oxidation unit to a predetermined level with a catalyst liquid, said catalyst liquid containing at least 3% of a cobalt salt in a relatively dry lower aliphatic acid, activating the catalyst liquid by means of a lower aliphatic aldehyde and a gaseous oxidizing medium passed therethrough, introducing feed materials into contact with this activated catalyst liquid substantially continuously and also substantially continuously and simultaneously introducing into the catalyst liquid gaseous oxidizing medium, said feed materials comprising as the primary component the lower aliphatic alcohol to be oxidized, but the feed materials also having present a content of lower aliphatic aldehyde in an amount at least as great as ⅓ the amount of alcohol being supplied, the feed materials also including a content of ester corresponding to the ester resulting from the reaction of the aliphatic acid being produced reacted with the aliphatic alcohol being oxidized, maintaining said oxidation unit and the catalyst solution therein under a pressure in excess of 1 atmosphere and a temperature above 50° C. but below a temperature at the pressure prevailing in the oxidation unit and the return of dry acid to be set forth hereinafter whereby the predetermined level of catalyst liquid would be substantially lowered, substantially continuously during the process withdrawing from the oxidation unit and condensing effluent gases containing aliphatic acid produced in the aforementioned oxidation, and adding sufficient dry aliphatic acid to the catalyst solution in the oxidation unit for keeping the acid content thereof in excess of 80%.

4. An improved process for the direct oxidation of relatively large amounts of aliphatic alcohols to the corresponding organic acid at high efficiency which comprises providing an oxidation zone with an activated catalyst liquid, the catalyst liquid being comprised of a relatively dry aliphatic acid containing 3–6% of a catalytic metal salt which liquid has been activated by passing therethrough a lower aliphatic aldehyde and a gaseous oxidizing medium, substantially continuously introducing gaseous oxidizing medium and feed materials into contact with the aforementioned activated catalyst liquid, said feed materials containing as a primary component a relatively larger amount of alcohol to be oxidized, but also containing a substantial content of lower aliphatic aldehyde, maintaining pressure on the oxidation zone in excess of 1 atmosphere and a temperature above 50° C., but not more than 10° above the boiling point of the organic acid being produced at the pressure prevailing on the process, substantially continuously withdrawing from the oxidation process effluent gases containing principally lower aliphatic acid together with some aldehyde and alcohol, subjecting the effluent gases to condensation whereby a liquid containing the aliphatic acid is obtained, substantially continuously passing the uncondensed gases from the condensation aforementioned through a series of pressure controlled scrubbers, subjecting the aliphatic acid liquid to azeotropic distillation for producing a relatively dry acid and substantially continuously incorporating into the catalyst liquid in the reaction zone sufficient dry lower aliphatic acid for keeping the acid content of the catalyst solution in excess of 80%.

5. A process for the oxidation of oxidizable lower aliphatic alcohols to the corresponding organic acids by improved procedure whereby larger amounts of the alcohol may be oxidized under increased capacity conditions at relatively long sustained periods of heavy duty continuous operation which might otherwise tend to cause the process to terminate because of catalyst failure, which comprises providing an oxidation zone with an aldehyde-activated catalyst liquid containing a content of lower aliphatic acid in excess of 80%, substantially continuously supplying to the catalyst liquid gaseous oxidizing medium and feed materials, the feed materials containing as a primary component the lower aliphatic alcohol to be oxidized but also containing a substantial content of lower aliphatic aldehyde, substantially continuously withdrawing oxidation products along with some catalyst liquid from the reaction zone, subjecting the withdrawn components to separation for taking out some of the catalyst, which catalyst is returned to the oxidation zone subjecting the effluents of the preceding step to scrubbing with dry acid, which dry acid is conducted from the scrubbing step to the catalyst liquid in the oxidation zone for keeping an acid content in excess of 80% in the catalyst liquid.

6. An improved process for the direct oxidation of ethanol for producing the corresponding organic acid therefrom, whereby greater amounts of said ethanol may be processed at high efficiency which comprises incorporating in an oxidation zone to a predetermined level a liquid oxidation catalyst, said liquid catalyst consisting essentially of a relatively dry lower aliphatic acid containing greater than 3% of a cobalt salt, passing acetaldehyde and air through said relatively dry acid containing cobalt salt until the catalyst liquid becomes activated introducing feed material and air into contact with said activated catalyst liquid, said feed materials consisting essentially of the ethanol to be oxidized and also a content of acetaldehyde, said ethanol being the primary component of the feed, but the content of said acetaldehyde being at least as great as ⅓ the amount of the alcohol, maintaining said oxidation process under a pressure in excess of ½ atmosphere at a temperature above 50° C. and below a temperature at the pressure of the reaction whereby the predetermined level aforementioned is caused to become materially lowered, withdrawing and condensing under pressure acetic acid produced, and substantially continuously adding dry acetic acid to the activated catalyst liquid aforementioned in an amount of 1.5–3 pounds of acid per pound of acid produced.

7. An improved process for the direct oxidation of propyl alcohol for producing the corresponding organic acid therefrom, whereby greater amounts of propyl alcohol may be processed at high efficiency which comprises incorporating in an oxidation zone to a predetermined level a liquid oxidation catalyst, said liquid catalyst consisting essentially of a relatively dry lower aliphatic acid containing greater than 3% of a catalyst salt, passing lower aliphatic aldehyde and gaseous oxidizing medium through said relatively dry acid liquid containing catalyst salt until the catalyst becomes activated, introducing feed material and air into contact with said activated catalyst solution, said feed materials consisting essentially of the propyl alcohol to be oxidized and also a substantial content of lower aliphatic aldehyde, maintaining said oxidation process under a pressure in excess of 1 atmosphere at a temperature above 50° C. and below a temperature at the pressure of the reaction whereby the predetermined liquid level aforementioned is caused to become materially lowered, withdrawing and condensing under pressure propionic acid produced by the aforesaid oxidation and substantially continuously adding relatively dry lower aliphatic acid to the catalyst liquid aforementioned whereby the acid content of the catalyst liquid is maintained in excess of 80% during the operation of the process.

DAVID C. HULL.

REFERENCES CITED

The following references are of record in the file of this patent:

UNITED STATES PATENTS

| Number | Name | Date |
|---|---|---|
| Re. 19,478 | Hale | Feb. 26, 1935 |
| 1,910,341 | Jodeck | May 23, 1933 |
| 2,265,948 | Loder | Dec. 9, 1941 |
| 2,287,803 | Hull | June 30, 1942 |
| 2,353,158 | Hull | July 11, 1944 |
| 2,353,160 | Hull | July 11, 1944 |
| 2,405,967 | Loder | Aug. 20, 1946 |
| 2,425,882 | Hull | Aug. 19, 1947 |
| 2,429,127 | Graham et al. | Oct. 14, 1947 |
| 2,451,332 | Green | Oct. 12, 1948 |